No. 882,370. PATENTED MAR. 17, 1908.
B. M. BUEHLER.
MANURE SPREADER.
APPLICATION FILED JUNE 12, 1907.
2 SHEETS—SHEET 1.
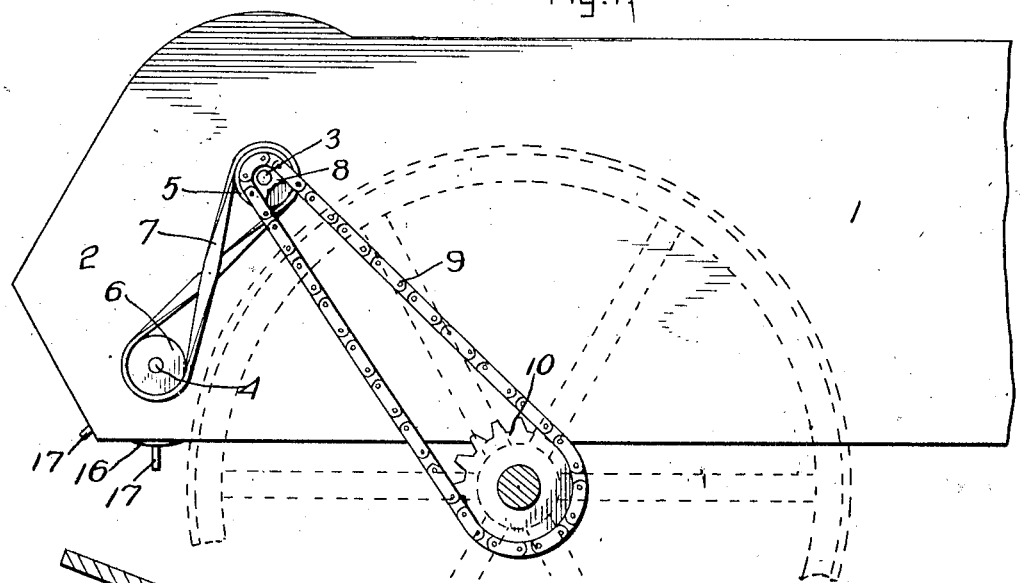
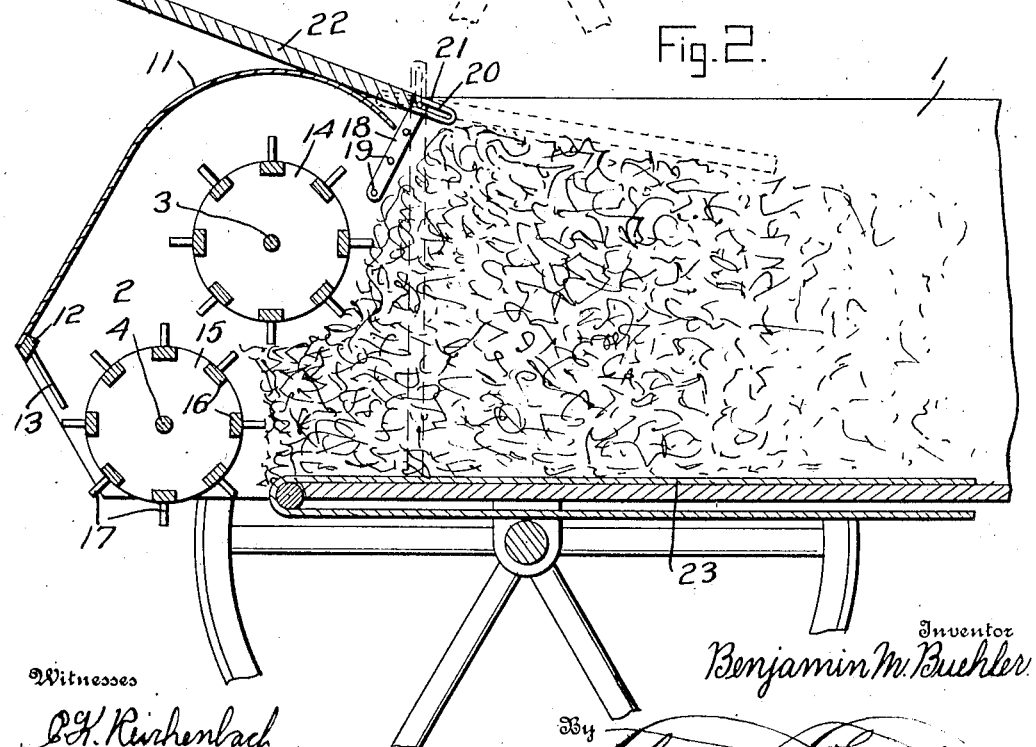
Witnesses
Inventor
Benjamin M. Buehler
By
Attorneys No. 882,370. PATENTED MAR. 17, 1908.
B. M. BUEHLER.
MANURE SPREADER.
APPLICATION FILED JUNE 12, 1907.
2 SHEETS—SHEET 2.
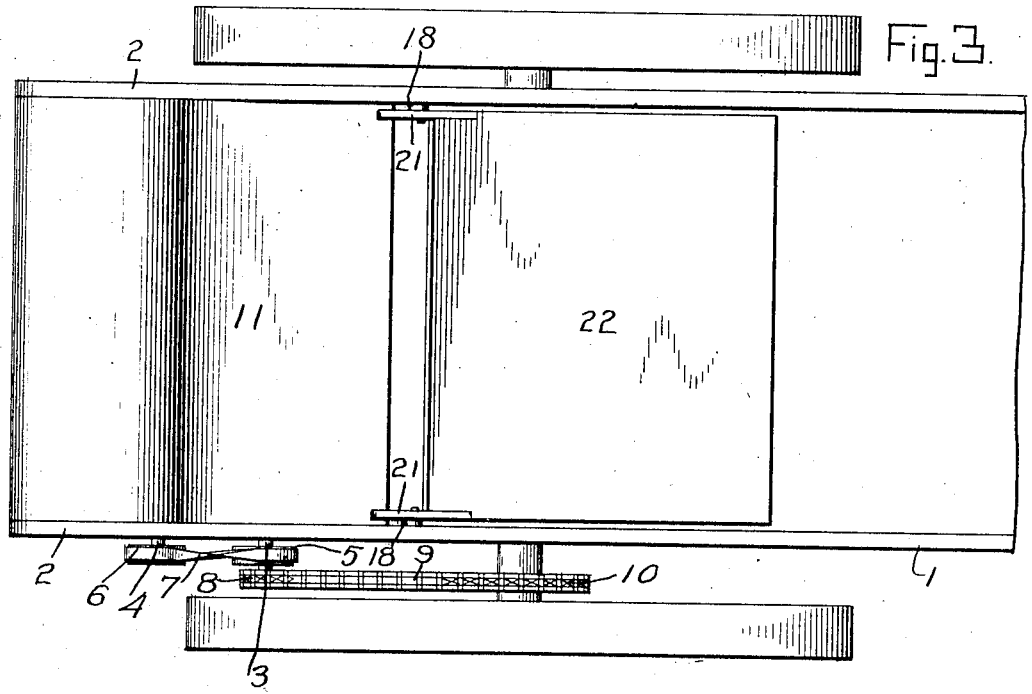
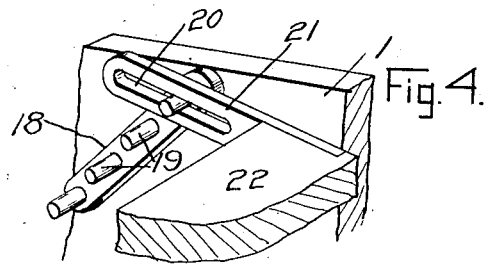
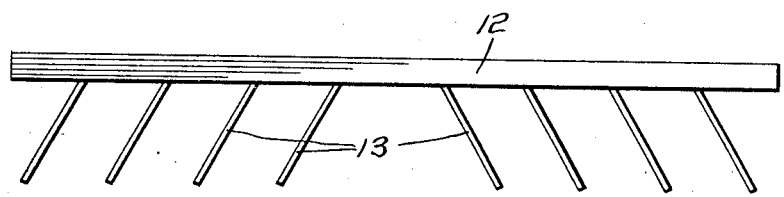

UNITED STATES PATENT OFFICE.

BENJAMIN M. BUEHLER, OF ODEBOLT, IOWA.

MANURE-SPREADER.

No. 882,370.  Specification of Letters Patent.  Patented March 17, 1908.

Application filed June 12, 1907. Serial No. 378,603.

*To all whom it may concern:*

Be it known that I, BENJAMIN M. BUEHLER, a citizen of the United States, residing at Odebolt, in the county of Sac, State of Iowa, have invented certain new and useful Improvements in Manure-Spreaders; and I do hereby declare the following to be a full, clear, and exact description of the invention, such as will enable others skilled in the art to which it appertains to make and use the same.

This invention relates to new and useful improvements in fertilizer distributers and generally speaking it includes superposed distributing cylinders, a rake for distributing the fertilizing material therefrom and a follower for forcing the material against the cylinders.

The object of the invention is to provide a novel construction, combination and arrangement of parts, the details of which will appear in the course of the following description in which reference is had to the accompanying drawings forming a part of this specification, like characters of reference designating similar parts throughout the several views wherein, Figure 1 is a side elevation showing the manner of use of a fertilizer distributer constructed in accordance with the present invention. Fig. 2 is a central longitudinal section of a manure spreader constructed in accordance with the present invention and showing by dotted lines the various positions of the follower above referred to. Fig. 3 is a top plan view thereof. Fig. 4 is a detail fragmentary perspective view of such follower and its adjuncts. Fig. 5 is a detail view of the rake.

Referring specifically to the accompanying drawings the numeral 1 designates a wagon or conveyer of ordinary form, the sides of which are extended rearwardly as at 2 and support upper and lower transverse shafts 3 and 4, the latter being disposed rearwardly of the former. The shafts 3 and 4, project beyond one of the extensions 2 and carry belt wheels 5 and 6, the former driving the latter by means of a crossed belt 7. The shaft 3 also carries a sprocket wheel 8 which is driven by a chain 9 from a sprocket wheel 10, the latter being carried upon the power shaft of the conveyer. The extensions 2 are closed by a hood 11 which at its lower end carries a transverse rake head 12, the latter being provided with teeth 13 arranged divergently on opposite sides thereof. The shafts 3 and 4 carry cylinders 14 and 15, both being constructed with longitudinal bars 16 from which project teeth 17 employed to comminute the fertilizer. The extensions 2 are provided with straps 18 having laterally projecting pins 19 arranged in series and selected and corresponding pins 19 are engaged through slots 20 provided in projecting straps 21, the latter being carried by a follower board 22 disposed transversely of the wagon. The provision of the pins 19 in series affords means, whereby the pivotal center of the board 22 may be adjusted to selected positions.

When the wagon is being loaded with fertilizer the board 22 is swung over on the hood 11 and when the wagon has been loaded said board is swung over to lie flat upon the load and press the same against the toothed comminuting cylinders. It will be understood that the wagon is equipped adjacent its floor with the usual endless conveyer 23 operated in any suitable manner. The upper cylinder 14 serves to keep the lower cylinder 15 from becoming clogged or choked and the latter throws the material outwardly against the rake from which it gravitates and is spread laterally by the disposition of the teeth 13. The hood 11 serves to prevent the material from being blown away by the wind and also serves to protect the mechanism inclosed therein against the elements. The board 22, by virtue of its pivotal mounting affords an efficacious means for holding the load compact as it is fed rearwardly by the conveyer. The board, in attaining this function, acts by means of its weight as a gravity follower and moves downwardly on its pivot, upon the load as the latter gradually diminishes in size when it is fed from the wagon.

From the foregoing description it will be seen that simple and efficient means are provided for accomplishing the objects of the invention, but, while the elements herein shown and described are well adapted to serve the functions set forth it is obvious various minor changes may be made in the proportion shape and arrangement of the several parts, without departing from the spirit and scope of the invention as defined in the appended claims.

What is claimed, is,

1. An apparatus of the type set forth comprising the combination with a wagon having rearward extensions, of a hood supported transversely between said extensions, a rake head provided at the lower end of said hood, upper and lower toothed cylinders supported for rotation between said extensions and a follower disposed transversely between the sides of said wagon and pivotally supported therefrom to lie upon the load in said wagon as and for the purpose set forth.

2. An apparatus of the type set forth, comprising the combination with a wagon having rearward extensions, of a toothed cylinder supported for rotation between said extensions, straps secured to said extensions, a series of pins projecting laterally from each of said straps, a follower board disposed transversely between the sides of said wagon, and rearwardly extending straps carried by said follower board, and formed with longitudinal slots to surround selected ones of said pins on each of said straps.

In testimony whereof, I affix my signature, in presence of two witnesses:

BENJAMIN M. BUEHLER.

Witnesses:
A. E. BAKER,
WAYNE M. SAYRE.